United States Patent

Lewis et al.

[11] 4,293,158
[45] Oct. 6, 1981

[54] GATE WITH RAMP DEVICE FOR LIVESTOCK TRAILER WITH LIFT DECK

[75] Inventors: Mack A. Lewis, Sioux City, Iowa; Mike R. Spencer, Hubbard, Nebr.

[73] Assignee: Wilson Trailer Company, Sioux City, Iowa

[21] Appl. No.: 84,117

[22] Filed: Oct. 12, 1979

[51] Int. Cl.³ ............................................. B62D 33/04
[52] U.S. Cl. ..................................... 296/24 C; 119/9
[58] Field of Search .................. 296/24 C, 24 R, 202, 296/50, 51, 53, 55, 56, 57 R, 61; 119/9, 82, 15, 19

[56] References Cited

U.S. PATENT DOCUMENTS

| | | | |
|---|---|---|---|
| 1,946,013 | 2/1934 | Campbell | 296/61 UX |
| 2,626,182 | 1/1953 | Troth et al. | 296/61 |
| 2,970,861 | 2/1961 | Short | 296/24 C |
| 3,020,083 | 2/1962 | Doan et al. | 296/24 C |
| 3,292,967 | 12/1966 | Peek | 296/24 R |
| 4,153,289 | 5/1979 | Lewis et al. | 296/24 C |

*Primary Examiner*—David M. Mitchell
*Assistant Examiner*—Norman L. Stack, Jr.
*Attorney, Agent, or Firm*—Harvey B. Jacobson

[57] ABSTRACT

A drop center trailer having at least one compartment forward of the drop center portion is provided with a hinged gate and ramp assembly connected to the trailer between the drop center and the forward portions. When the trailer is used with decks in the forward compartment or with vertically movable decks over the drop center portion, the gate and ramp assembly is used to provide access between the various levels within the trailer. Furthermore, if a movable deck is used in the drop center portion and aligned with the flooring of the forward portion, the gate and ramp assembly can be swung adjacent to the side of the trailer to provide clearance for straight through loading of freight.

3 Claims, 8 Drawing Figures

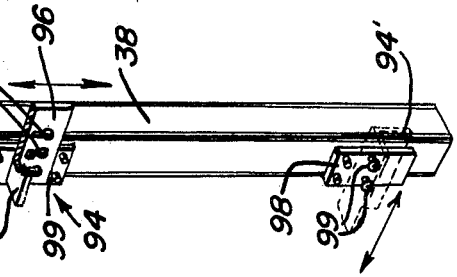
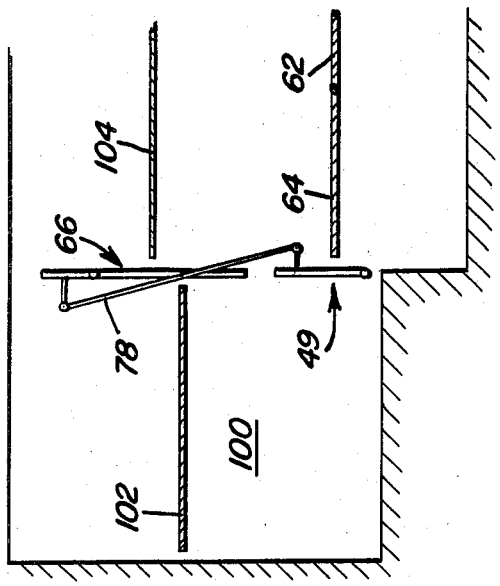
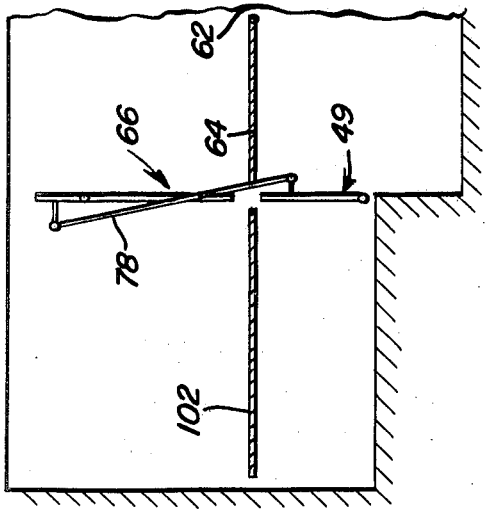
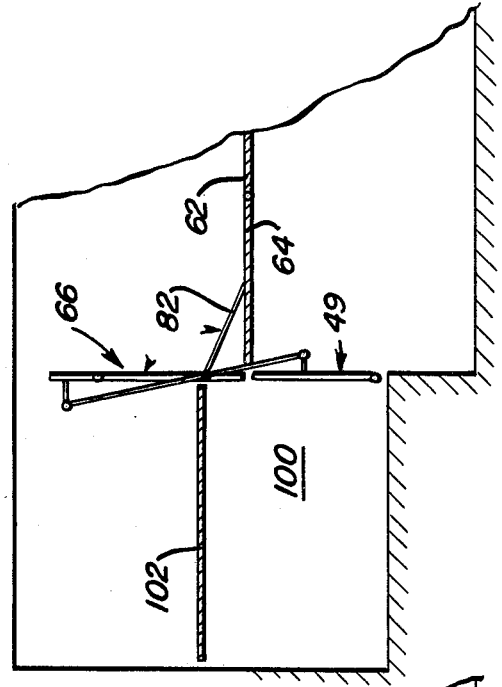
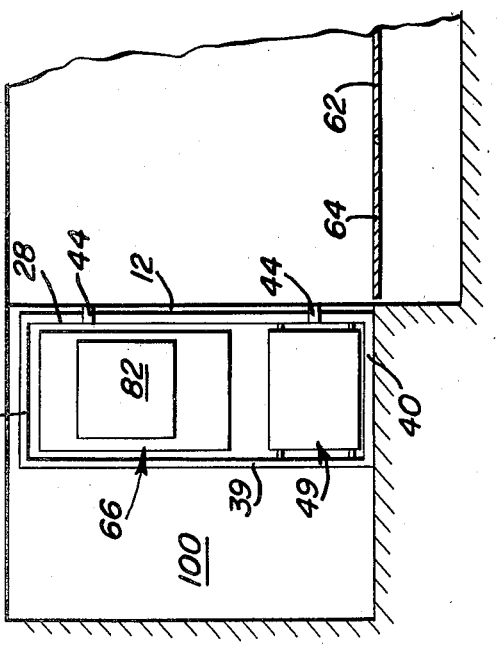
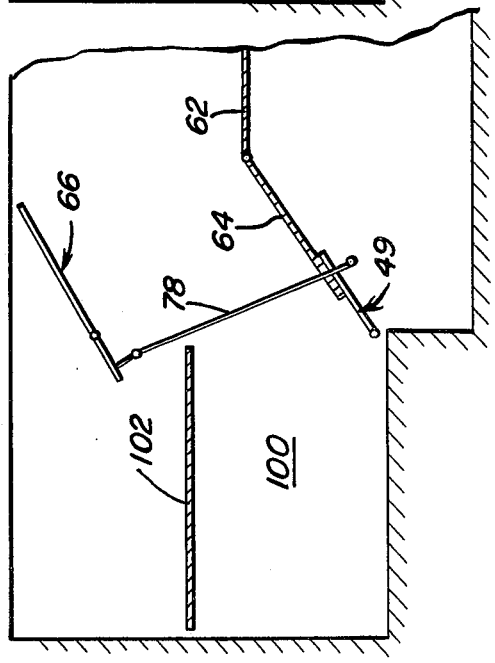

GATE WITH RAMP DEVICE FOR LIVESTOCK TRAILER WITH LIFT DECK

BACKGROUND OF THE INVENTION

1. Field of the Invention

This invention relates to gate and ramp assemblies for drop center trailers incorporating decks in the forward trailer compartment and movable decks in the drop center portion of the trailer.

2. Discussion of Related Art

In the design and manufacture of trailers for the transportation industry, it is desirable and beneficial to produce trailers which can easily be adapted for transportation of a variety of cargo. For instance, livestock trailers can be provided with a plurality of decks which are adjustable in height for transporting smaller creatures on numerous levels while larger livestock can be disposed in fewer levels by merely adjusting the decks. At the same time, drop center trailers have become popular for providing the greatest available cargo space, thereby reducing the cost per item being transported. When using drop center trailers combined with decks disposed about the interior of the individual trailer, a problem of accessability arises. Accordingly, the need has arisen for some means of moving cargo, such as livestock, from one level within the trailer to other adjacent levels.

Access to the various levels of a multi-deck vehicle body is usually accomplished by use of a plurality of ramps. For instance, U.S. Pat. No. 1,946,013, issued Feb. 6, 1934, to Campbell, shows a plural deck vehicle body which can be readily subdivided into two or more compartments separated by vertical partitions or subdivided into two or more compartments separated from one another by horizontal partitions. The side of the vehicle can be open for facilitating the loading of various compartments. A ramp or gangway is provided with hook members for detachably attaching it to the various decks. The ramp can slide endwise upon a shelf for storage. U.S. Pat. No. 1,639,879, issued Aug. 23, 1927, to Buffington, shows a combined end gate and ramp for loading or unloading truck beds. A ramp is provided with a pair of hingedly mounted side walls which may fold against one side of the ramp at which time the device can be used as a tailgate. U.S. Pat. No. 4,037,564, issued July 26, 1977, to Schrock, shows a collapsible livestock ramp which is pivotally attached to a pair of side walls. The side walls can be folded into an overlying position enabling the ramp to be lifted over a vehicle enclosure in a door-like manner.

SUMMARY OF THE INVENTION

One object of the present invention is to provide a gate and ramp device for trailers with lift decks which is versatile in use and capable of being adapated to provide communication between a plurality of floors and decks having various heights.

A further object of the present invention is to provide a gate and ramp device for trailers with lift decks which can be swung adjacent the side wall of the trailer for providing unobstructed through loading of the trailer, if desired.

Yet another still further object of the present invention is to provide a gate and ramp device for trailers with lift decks which also includes a vertically movable support for supportingly engaging a movable deck in different positions.

In accordance with the above objects, the present invention provides a main frame which extends across the entire width of a drop center trailer in the area of transition between the forward portion and drop center portion of the trailer. Mounted within the frame on one side thereof are a plurality of vertically aligned gates hinged to one vertical element of the main frame. On the opposite side of the frame, there is located a sectional gate structure which is mounted in a swing frame and is capable of assuming a first position wherein it acts as a gate limiting the movement of the livestock within the trailer and a second position wherein it supports a ramp for facilitating the loading and unloading of the livestock from a movable trailer deck. The ramp is pivotally attached to one end of a movable deck and is supported by a lower section of the sectional gate structure. The ramp is allowed to drop from its normal horizontal position to an inclined position by moving the lower section of the gate structure to an inclined position. Connected to the lower gate section is an upper gate section which is pivotally connected to the side walls of the trailer. The upper gate section is connected to the lower section by a connecting rod so that the lower section is rotated from its normal vertical position to the inclined position. Additionally, the upper gate section has incorporated therein an additional ramp which pivots about a horizontal axis for providing communication between vertically spaced decks located in adjacent compartments of the trailer. The swing frame is mounted by offset hinges to an upright of the main frame and can swing to a position alongside one side of the trailer body to allow load through access to the trailer interior.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a schematic representation showing a trailer with a lift deck in the freight hauling position and the gate swing frame disposed along the trailer side wall.

FIG. 4 is a schematic representation showing the use of side gates to load the forward trailer decking.

FIG. 5 is a schematic representation showing the use of the ramp for loading the forward trailer compartment.

FIG. 6 is a schematic representation showing the use of the calf ramp for loading the forward trailer decking.

FIG. 7 is a schematic representation demonstrating a trailer with a plurality of vertically spaced decks and showing the use of the side gates for loading the forward trailer compartment.

FIG. 8 is a perspective view of the vertically adjustable support of the invention.

DESCRIPTION OF THE PREFERRED EMBODIMENT

Figure 2:
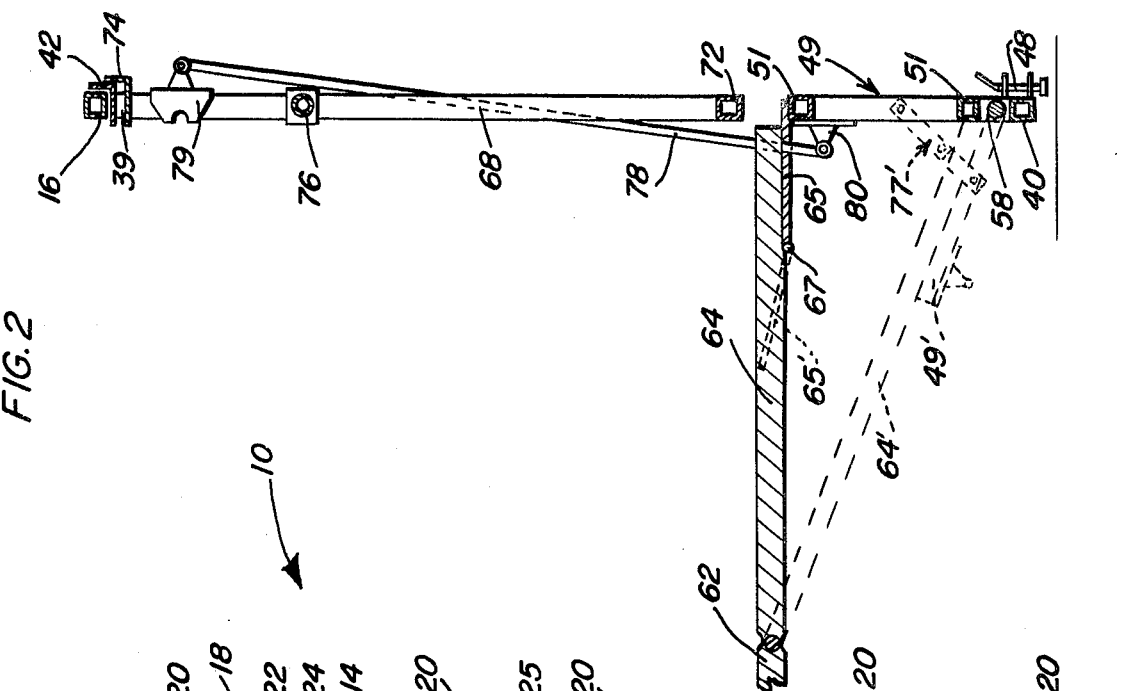
FIG. 2 is an elevational sectional view taken substantially along a plane passing through section line 2—2 of FIG. 1.
Figure 1:
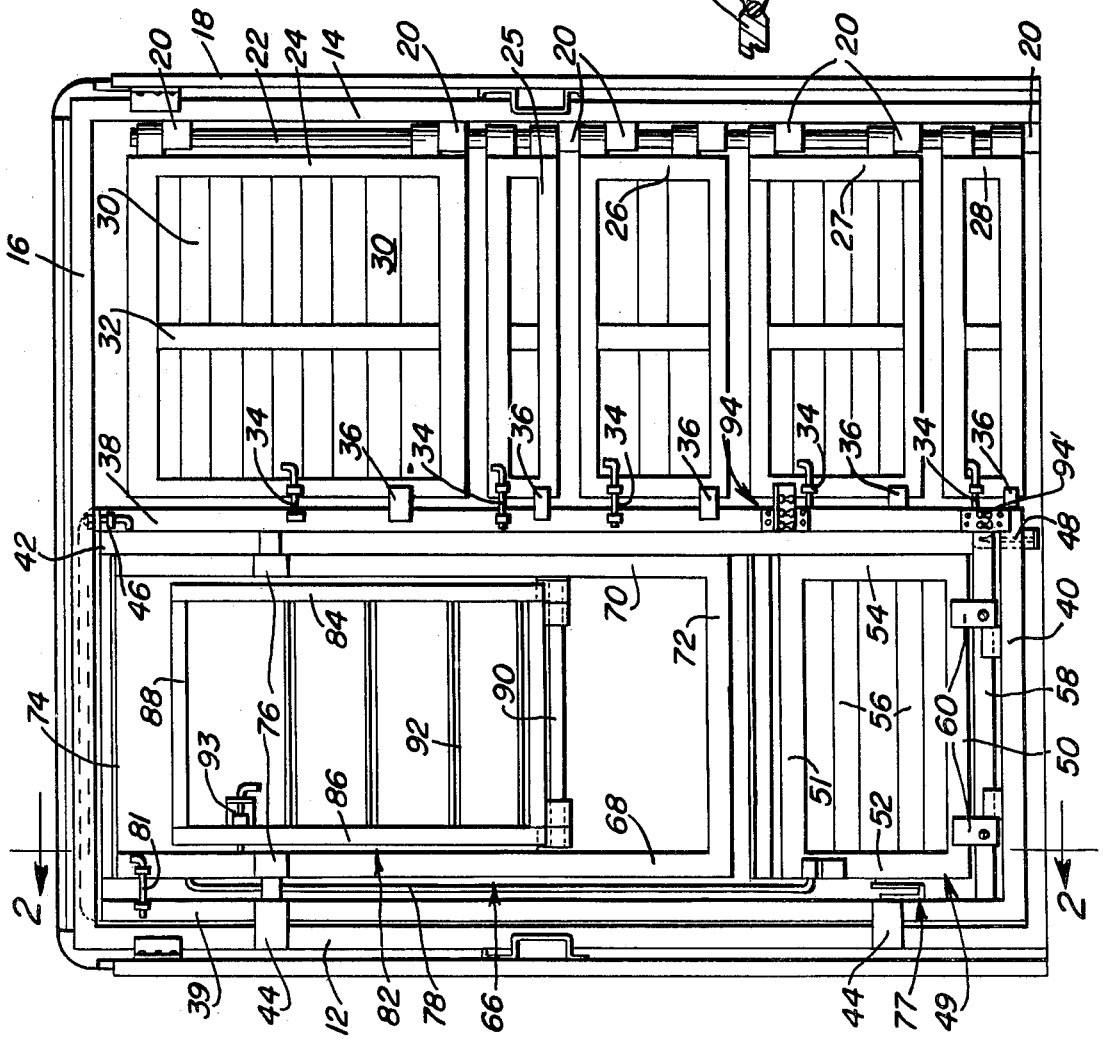
FIG. 1 is a rear elevational view of the gate and ramp device of the present invention.

Now with reference to the drawings, a gate and ramp device incorporating the concepts and principles of the present invention and generally designated by the reference numeral 10 will be described in detail. With particular reference to FIGS. 1 and 2, it can be seen that the gate and ramp device 10 includes a main outer frame comprising vertical uprights 12 and 14 which are interconnected by horizontal frame member 16. The main frame is fixedly attached about the inner periphery of trailer 18, which is generally of the drop center type. The frame should be disposed just forward of the drop center and just before to the forward trailer cargo compartment. Extending parallel to upright 14 and mounted thereto by a plurality of mounts 20 is a pivot tube 22. Pivot tube 22 mounts a plurality of gates which are hingedly connected thereto and can thereby be disposed against the adjacent trailer side wall. As shown, five gates 24, 25, 26, 27 and 28 are mounted on the pivot tube 22. The number of gates can vary as desired. The five gates shown are designed to accommodate a maximum of two rear decks and one forward deck, the rear decks being capable of assuming several vertical positions. Each of the gates 24 through 28 are identical in width, differing only in the individual gate height. Also, each gate, as for example gate 24, can have one or more horizontal cross members 30 interconnected by a vertical member 32. Alternatively, the gates can be of a pan type construction wherein the horizontal members 30 are replaced by a single formed sheet. Each gate is also equipped with a latch mechanism 34 to effect closure of the gate. One or more latch members 34 can be used on each gate as desired. Also attached to each gate is a gate stop member 36 which allows the gate to swing in only one direction. The latches 34 and stop members 36 each co-act with an upright member 38 to effect closure of the gates. Of course, slam type latches which act as stops themselves can be used in place of latches 34 and stop members 36, as desired.

The upright 38 is actually one member of a swing frame assembly which comprises uprights 38 and 39 and which are connected by lower horizontal member 40 and an upper horizontal member 42. Uprights 38 and 39 and lower horizontal member 40 are each rectangular tubular members which are welded at their ends to form a rectangular framework. The upper horizontal member 42 is an angle member having one portion of the angle welded to the ends of members 38 and 39. The other portion of the angle abuts the rear of horizontal frame member 16 to form a stop for the swing frame assembly. The entire swing frame assembly pivots about upright 12 through hinges 44. Hinges 44 are offset in order that the swing frame assembly can pivot completely about upright 12 and lie flat against the trailer side wall. A pair of latches 46 and 48 are mounted on the swing frame assembly and coact with horizontal member 16 of the main frame and the trailer floor respectively for holding the swing frame assembly in its closed position.

Mounted within the swing frame assembly is a sectional gate structure, substantially as disclosed in U.S. Pat. No. 3,292,967, issued Dec. 20, 1966, to Peek, the disclosure of which is incorporated herein by reference thereto. The sectional gate structure includes a lower gate 49 having a frame comprising horizontal members 50, 51 and vertical members 52, 54. Additionally, the cross members 56 are connected between the vertical member 52, 54. Lower gate 49 is pivotally connected to a pivot tube 58 which extends between swing frame upright members 38 and 39. Hinges 60 are fixedly attached to member 50 and pivot about tube 58. Accordingly, it can be seen that with lower gate 49 in its vertical disposition, and with a movable deck 62 located as shown in FIGS. 1 and 2, a ramp 64 pivotally attached to the movable deck and including a plate 65 can be supported upon the top of lower gate 49 by virtue of plate 65 resting on top of member 51. Plate 65 can be swung about hinge 67 (FIG. 2) to storage position 65' (shown in phantom) when the lift deck 62 is to be lowered. Plate 65 can be held in position 65' by a latch or any other suitable holding mechanism. It can also easily be seen that if lower gate 49 is pivoted rearwardly, the ramp 64 will assume an inclined position extending downwardly from the movable deck 62.

An upper gate section 66 of the sectional gate structure includes two side frame members 68 and 70 which are interconnected by lower horizontal frame member 72. Frame members 68, 70 and 72 are formed from tubular members and are interconnected to form a generally rectangular shape. A final horizontal frame member 74 is connected to the ends of side frame members 68 and 70 and is itself an angle member with one side of the angle welded to the ends of the side frame members 68 and 70. The other section of the angle forms a stop for the upper gate section and abuts against member 42 of the swing frame assembly. The upper gate section is pivotally connected to the swing frame through the use of horizontally oriented pivot joints 76. The upper and lower gate sections are interconnected by a reach rod 78 which is pivotally attached to connectors 79 and 80 which extend from the upper and lower gate sections in opposite directions respectively therefrom. Accordingly, when upper gate section 66 is pivoted about pivot joint 76, reach rod 78 causes lower gate section 49 to pivot rearwardly to an inclined position shown in phantom in FIG. 2 at 49'. This causes the end of ramp 64 to be lowered to an inclined position shown at 64'. The lower gate section 49 is held in the inclined position by a two-piece linkage arrangement connected between members 52 and 39. This linkage arrangement is shown at 77 in FIG. 1 and in its extended position in phantom at 77' in FIG. 2. A latch mechanism 81 is included on the upper gate section and extends between that gate section and the swing frame for holding it in its vertical orientation.

Mounted within the upper gate section 66 is a calf ramp 82. Calf ramp 82 includes two side rails 84 and 86 which are interconnected at the top by member 88. Side rails 84 and 86 are hingedly connected at their opposite ends to tube 90 which extends into frame members 68 and 70 of the upper gate section thereby providing a pivotal connection between the calf ramp and the upper gate section. The calf ramp construction is of one-piece design having cross members 92 formed integrally therewith to form a solid ramp for creatures to walk on. A latch 93 is also included on the calf ramp for coacting with the upper gate section 66 to hold the ramp in its vertical orientation.

Finally, a support member 94, seen in FIGS. 1 and 8, is attached to the upright 38 of the swing frame assembly for selectively supporting the movable deck 62 and/or ramp 64. Support member 94 comprises an angle section having three vertically oriented keyhole slots 95 formed in one leg section 96. The other leg section 96' lies in a horizontal plane for supporting a lift deck.

Support member 94 engages upright member 38 through the use of support plates 97 and 98 which are fixedly mounted to upright 38 at vertically spaced positions on the upright. Plates 97 and 98 may be mounted by the use of rivets, bolts or any other suitable means. Each mounting plate 97, 98 contains two headed projections 99 which cooperate with two of the three slots 95 to releasably hold support member 94. It will be noted that when attached to plate 97, the left two slots 95 (as viewed in FIGS. 1 and 8) are used thus causing member 94 to project to the right of member 38 with the left side of member 94 being in substantial alignment with the left side of member 38. When moved to plate 98, as shown in phantom at 94', the rightmost slots 95 are utilized thus causing member 94 to straddle member 38.

It will be understood that ramp 64 extends for substantially one-half of the trailer width and is in lateral alignment with the remainder of deck 62 (not shown), which extends up to the gates 24 with a portion overlying the support 94. Accordingly, with support 94 extending as shown in solid lines in FIG. 8, it acts as a support for the deck. In this position, plate 65 is attached to ramp 64 and supports the ramp on lower gate section 49. When the deck 64 is lowered, plate 65 is rotated and stored in position 65'. The support 94 is lowered to position 94' on the post 38 as shown in phantom in FIG. 8, and acts as a support for both the deck 62 and ramp 64.

In FIG. 3, it can be seen that with the movable deck 62 and the ramp 64 disposed at the level of the flooring of forward compartment 100 of a drop center trailer and supported by any suitable known means, and with the swing frame assembly comprising frame members 38, 39, 40 and 42 swung sideways adjacent the trailer side wall on offset hinges 44, straight through access to the entire trailer interior for loading and unloading freight can be easily had.

FIG. 4 shows a trailer configuration using a forward deck 102 together with the rear deck 62 and the ramp 64. It is easily understood that with the deck configuration of FIG. 4, communication between the deck 62 and deck 102 can be had by opening the appropriate ones of gates 24 through 28 of FIG. 1. The deck position of deck 62 of FIG. 4 is essentially that of FIGS. 1 and 2. Therefore, it will be noted that deck 62 can be supported through use of support 94 shown in solid lines in FIGS. 1 and 8, while ramp 64 is supported on lower gate section 49 by use of plate 65.

Now with reference to FIGS. 5 and 6, it will be seen that forward deck 102 has been raised to accommodate animals on the floor of forward compartment 100. Accordingly, through use of the gate and ramp mechanism including upper and lower gate sections 49 and 66 in cooperation with ramp 64, animals can be loaded from deck 62 to the floor of compartment 100, as shown in FIG. 5. Additionally, animals can be moved from deck 62 to the forward deck 102 by lowering calf ramp 82 thereby providing access between the decks at differing levels as shown in FIG. 6. It will also be noted that the rear deck 62 shown in FIG. 6 can be supported by support 94 in its upper position as shown in FIG. 8.

FIG. 7 shows the use of a second deck 104 to divide the rear compartment into three levels. A single forward deck 102 is still in use. Accordingly, smaller animals can be loaded into a trailer using the configuration of FIG. 7 by simply opening the appropriate gates 24 through 28 and allowing the animals access between deck 104 and deck 102. It will also be noted that by lowering the support 94 to the position shown in phantom of FIG. 8, the deck 62 and the ramp 64 can be supported by that support.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a compartment for transporting and storing livestock having two sidewalls, a base floor and at least one platform disposed between said sidewalls and being vertically movable within said compartment; a framework pivotally connected to one of said sidewalls for movement between a first position transversely of said compartment and a second position adjacent one of said sidewalls; a lower gate; a first hinge means connecting said lower gate to said framework for movement about a horizontal axis; an upper gate; a second hinge means connected to said framework and vertically spaced from said first hinge means, said second hinge means being connected to said upper gate for pivoting said upper gate about a horizontal axis; a rod hingedly connected to said upper gate and to said lower gate; a ramp hingedly connected to said at least one platform, and further including a plurality of gates hingedly connected to a second one of said sidewalls, said plurality of gates being vertically spaced and capable of movement between a position transverse of said compartment aligned with said framework and a position adjacent said second of said sidewalls, and a deck support member attached to and movable with said framework, said deck support member including height adjustment means for effecting vertical adjustment of said deck support member, said deck support member further including one angle member having a plurality of keyhole slots formed therein and a pair of support plates attached to said framework and containing a plurality of projections for interconnection with said keyhole slots, said angle member being transversely positionable with respect to said support plates so as to optionally locate said deck support member in positions whereby the same will not interfere with rotational movement of the operably associated gates.

2. The apparatus of claim 1 and further including an additional ramp hingedly connected to said upper gate for movement about a horizontal axis.

3. The apparatus of claim 1 and further including ramp support means pivotally mounted between said ramp and said lower gate for supporting said ramp on said lower gate.

* * * * *

UNITED STATES PATENT AND TRADEMARK OFFICE
CERTIFICATE OF CORRECTION

PATENT NO. : 4,293,158
DATED : October 6, 1981
INVENTOR(S) : Mack A. Lewis et al It is certified that error appears in the above-identified patent and that said Letters Patent is hereby corrected as shown below:

Column 6, after line 61, insert the following:

--4. The apparatus of claim 1 wherein each of said gates includes a latch means for locking said gates, each of said latch means extending between its respective gate and said framework when the respective gates are locked.--

On the title page after the abstract, "3 Claims" should read --4 Claims--.

Signed and Sealed this

Sixth Day of September 1983

[SEAL]

Attest:

GERALD J. MOSSINGHOFF

Attesting Officer

Commissioner of Patents and Trademarks